March 7, 1967    J. SPINA    3,307,288
TERMINAL TACKLE RIGGED WITH SELF-CONTAINED SPREADERS
Filed Nov. 2, 1964
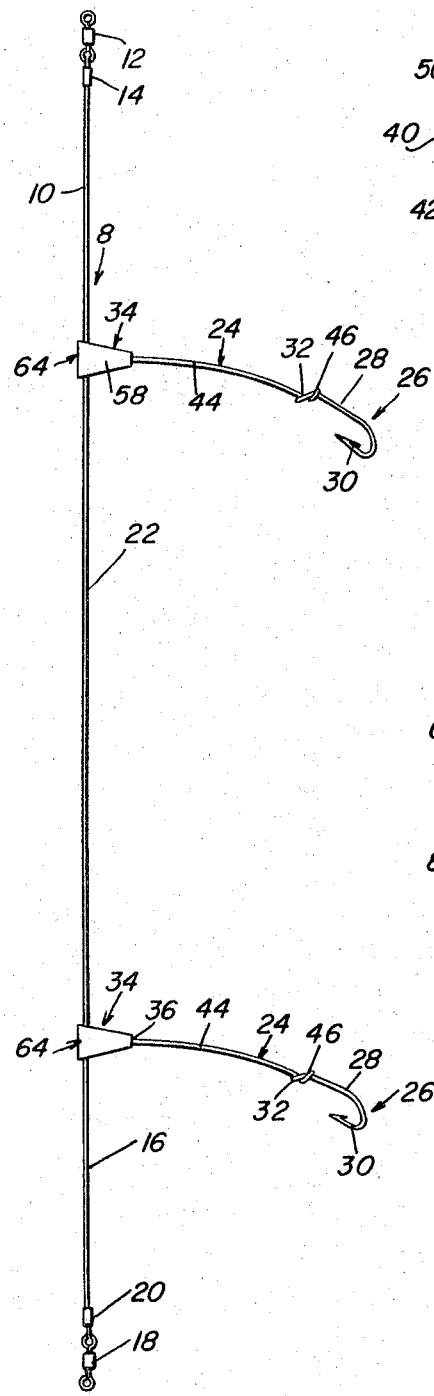
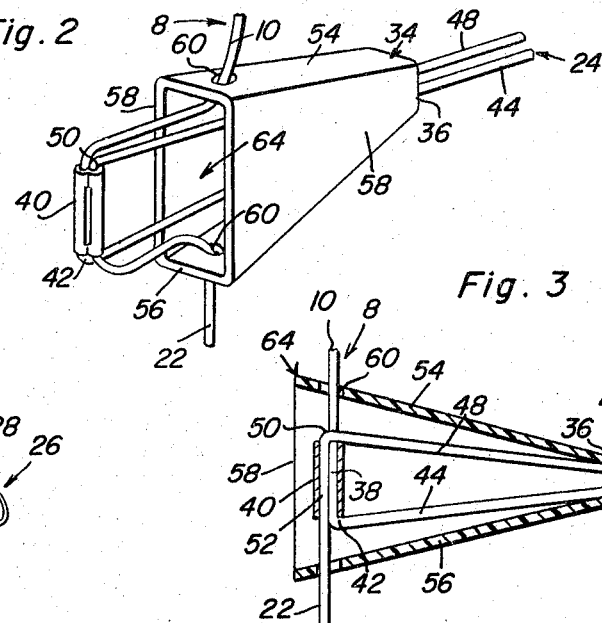
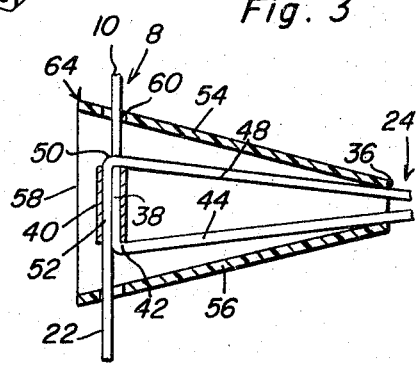
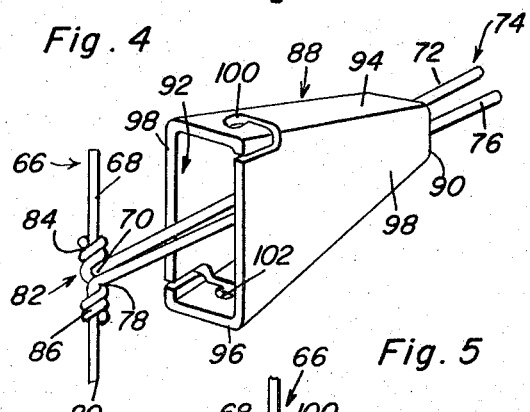
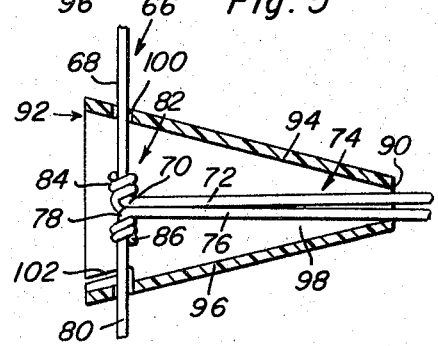
Joseph Spina
INVENTOR.
BY Clarence A. O'Brien
and Harvey B. Jacobson
Attorneys United States Patent Office 3,307,288
Patented Mar. 7, 1967

3,307,288
TERMINAL TACKLE RIGGED WITH
SELF-CONTAINED SPREADERS
Joseph Spina, 3420 Washington Road,
West Palm Beach, Fla. 33405
Filed Nov. 2, 1964, Ser. No. 408,210
14 Claims. (Cl. 43—42.74)

This invention relates, broadly construed, to terminal tackle for the fishing end of a fish line, and more particularly, to a leader having a swivel or equivalent means at its rearward or upper end for connection with the line, a swivel or the like at its forward or lower end for a terminal accessory such as a lure, sinker or the like, and which is unique in that it is provided intermediate its ends with spaced nontangling hook-equipped spreaders.

An object of this invention is to provide a leader with one or more structurally and functionally distinct outstanding spreaders wherein each spreader is yieldingly pliant and subject to flexure when the fish takes the hook and also wherein the spreader is provided at its outer free end with a novelly attached fishhook, and is joined at its inner end to the leader in a manner and by means not known to be available in prior art spreaders.

To the ends desired the leader is made of synthetic plastic, preferably nylon. The spreader is also made of nylon or the like and comprises an elongated loop whose outer free end bight portion is hitched to the eye and shank of the fishhook in a novel manner. The loop can be an integral part of the leader, that is, bent from the leader itself, or can be separately made and its inner end clipped or otherwise attached to the leader. In either instance the inner end is fashioned and anchored in place in a distinctive manner. This result is achieved by using either a clip-on or clenched sleeve or thimble, or alternatively, by a nylon tying-element with its ends coiled around the leader above and below the spreader loop connecting joint.

A significant and further objective of the concept is to bolster and strengthen the joined end of the loop-type spreader. This can best be done, as experience has shown, by a structurally unique adapter; that is, a simple but highly practical truncated pyramidal plastic cone or sleeve. This sleeve is so attached and oriented with the leader and jointed end of the strands of the loop-type spreader that the portions of the strands proximal to the joint are stiffened and reinforced. Accordingly, undue side swinging and excessively abnormal flexing is controlled, whereby the limber and pliant spreader does the job intended with efficiency, as will be hereinafter more fully disclosed.

Two embodiments of adapters are comprehended. In both instances the outgoing and returning strands of the loop pass through the hollow portion of the encasing cone and project a limited distance beyond the truncated end. In one form holes are provided in upper and lower walls for passage of the leader. In the other form, bayonet-type slots or kerfs are utilized in a way which facilitates ready application and removal of the adapter or cone.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in elevation of a terminal tackle, more specifically an improved leader, equipped with novel self-contained spreaders.

FIG. 2 is a view in perspective of an enlarged fragmentary type which shows the improved adapter and how it is attached at one end to the leader, how the leader is formed into an elongated loop-type spreader and, more particularly, the manner in which the joint between the leader and spreader is made and before it is drawn into and concealed within the hollow portion of the adapter.

FIG. 3 is a view in section and elevation similar to FIG. 2 but showing the jointed leader and spreader in interrelated functioning relationship.

FIG. 4 is a view in perspective similar to FIG. 2 and showing a modified form of the invention with the slotted end of the adapter before it is attached to the complemental portions of the leader.

And FIG. 5 is a view in section and elevation similar to FIG. 3 but showing the modification of FIG. 4 with the parts in functioning relationship.

Referring first to FIG. 1 it will be seen that the overall ready-to-use terminal tackle comprises a synthetic plastic leader 8 having an upper end portion 10 provided with a swivel 12 clipped or otherwise connected in place at 14 and adapted in practice to be attached in the usual way to the forward end of the fish line (not shown). The lower end portion 16 is likewise constructed in that it is provided with a swivel 18 clipped in place for use as at 20. The median portion of the leader is denoted at 22.

The leader is provided with at least two outstanding spreaders which are of duplicate construction and are correspondingly attached to the leader and are spaced apart a suitable distance to prevent tangling with each other. Each spreader is the same in construction and a description of one will suffice for both. The spreader as an entity is denoted by the numeral 24 and is provided at its outer free end with a conventional type fishhook 26 embodying the usual shank 28, barbed hook 30 and eye 32 at the inward end of the shank. The adapter means which assists in connecting the jointed inner end of the spreader with the leader is denoted generally by the numeral 34. The embodiment of the adapter first to be considered is shown in FIGS. 2 and 3. This adapter comprises an elongated plastic open-ended truncated pyramidal cone. The basal end of the cone is attached to the leader and the smaller truncated end 36 is spaced from but approximately parallel to the leader. It is within the purview of the inventive concept to embody or incorporate the spreader in and as an integral part of the leader. This is shown in FIG. 3 wherein it will be noted that a portion 38 of the leader is threaded through an embracing and suitably clenched metal or equivalent sleeve 40. The leader is then bent upon itself as at 42 and directed laterally outward to provide one of the two strands or component parts 44. The bight portion at the outer end (see FIG. 1) is denoted at 46 and the return strand is denoted at 48. As further shown in FIG. 3 this strand 48 is again bent at 50 and passes through the aforementioned sleeve 40 as at 52. Thus it will be seen that a portion of the leader is fashioned into an elongated loop which in turn provides a pliant or flexible loop-type spreader. The bight portion 46 is threaded through the eye 30 and is then saddled over the shank and thus hitched to the hook. The hook assumes the usual position illustrated in FIG. 2 when in use.

It will be understood that by using a double strand loop as the outstanding spreader it is necessary to strengthen and rigidify the joint comprising the features 38 and 52 where they overlie each other and pass through and are encompassed within the sleeve 40. This accounts for the use of the stabilizing and flexure resisting adapter cone 34. The cone comprises a top wall 54, bottom wall 56 and two opposed side walls 58. The top and bottom walls are provided with registering or aligned holes 60 through which adjacent portions of the leader pass in the manner shown. With this construction it will be obvious that the larger basal end 64 of the cone is attached to the leader at points above and below the joint. The strands 44 and 48 pass through the hollow portion of the cone and outwardly beyond the truncated end 36. With the parts assembled and cooperating in the manner shown in ready-to-use relationship in FIGS. 1 and 3 it will be evident that the portions of the strands 44 and 48 are amply stiffened and reinforced to cause the spreader to stand out in the hook-supporting position shown in FIG. 1.

With further reference to FIG. 2 it will be evident that the purpose of this figure is merely to illustrate the manner in which the novel joint between the strands 44 and 48 and component portions of the leader is made.

Referring now to the modification shown in FIGS. 4 and 5 it will be evident that basic theme of the invention is the same as shown in FIGS. 2 and 3.

The leader is here denoted by the numeral 66, the portion 68 being bent upon itself at 70 and directed laterally to provide one strand or reach of the elongated loop-type hook suspending spreader 74. The other strand is denoted at 76. In practice these strands are joined together at their outer ends in the manner shown in FIG. 1 and likewise connected with the fishhook (not shown) here). The returning strand 76 is bent at 78 and joins with the portion 80 of the leader extending downwardly beyond the joint. The joint in this case is completed by using a short length of nylon which is here designated as a tying element 82 and whose intermediate portion spreads across the joint between the bends or bent portions 70 and 78. The ends of this tying element are coiled around the leader portions 68 and 80 as denoted at 84 and 86 respectively. The stabilizing and joint-bolstering adapter comprises a truncated pyramidal cone 88 basically the same as the one already described and wherein the truncated outer end is denoted at 90, the inner larger basal end at 92, the top wall 94, bottom wall 96 and side walls 98. The diagonally opposite corner portions at the open end 92 instead of having holes as at 60 in FIGS. 2 and 3 are provided with bayonet slots or attaching kerfs 100 and 102. The portions 68 and 80 of the leader 66 are removably engaged in the kerfs 100 and 102 at points above and below the joint. FIG. 4 shows the cone 88 detached and FIG. 5 shows the cone in its attached ready-to-serve position.

It will be clear that the spreader 24 or 74 as the case may be can be fashioned from component portions of the leader by forming the leader into the aforementioned loop. It would be within the purview of the invention however to provide a separate loop and to attach the inner end or end portions of the strands to the leader in an evident manner.

It will be further understood that because the elongated loop-type spreader is made of pliant monofilament nylon it was found necessary to bolster the jointing connection of the spreader with the leader and the truncated cones 34 and 88 have been found to be ideal for this purpose. The hollow portion of the cone conceals and shields the joint and the large open end distributes the points of stress and strain in a manner to amply reinforce the junctional connection between the inner end of the spreader and that part of the leader connected thereto.

Then, too, the fact that the truncated cones 34 and 88 are adapters made of plastic material contributes to the feasibility of molding them in distinguishably different colorful shades. One adapter can be red and the other one yellow. This aspect of the concept is significant inasmuch as bright colors are known to attract and lure fish to a baited hook.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Terminal tackle for attachment to the fishing end of a fish line comprising: a leader having means at its rearward end for connection with said line, connecting means at its forward end for a terminal accessory, a lure or sinker for example, said leader being made of monofilament nylon, an elongated nylon loop projecting laterally from said leader and having its inward end joined with said leader, the outer end of said loop having a bight portion, a fishhook having a shank with the usual eye at one end, said bight portion being hitched over the shank and the strands of the loop being threaded through the eye and thus linking and mounting the hook on the outer free end of the loop, and flexure resisting, swing-limiting and rigidifying means encasing a significant portion of said inward end, said last-mentioned means having an inner end portion connected with the leader contiguous to the joined inward end of said loop, said loop being fashioned from and comprising an integral looped portion of said leader, the inward end where it is junctionally joined being held in place by retaining and reinforcing means constituting a component part of the junctional joint, said rigidifying means comprising a sleeve-type thimble which is snugly sleeved over the end of said loop adjoined with said leader.

2. Terminal tackle for attachment to the fishing end of a fish line comprising: a leader having means at its rearward end for connection with said line, connecting means at its forward end for a terminal accessory, a lure or sinker for example, said leader being made of monofilament nylon, an elongated nylon loop projecting laterally from said leader and having its inward end joined with said leader, the outer end of said loop having a bight portion, a fishhook having a shank with the usual eye at one end, said bight portion being hitched over the shank and the strands of the loop being threaded through the eye and thus linking and mounting the hook on the outer free end of the loop, and flexure resisting, swing-limiting and rigidifying means encasing a significant portion of said inward end, said last-mentioned means having an inner end portion connected with the leader contiguous to the joined inward end of said loop, said loop being fashioned from and comprising an integral looped portion of said leader, the inward end where it is junctionally joined being held in place by retaining and reinforcing means constituting a component part of the junctional joint, said rigidifying means including a separate short length of stiff material fashioned into a tie-like connector, the later bridging the joint and having terminal ends thereof coiled tightly around portions of the leader at the site of the joint.

3. A nylon leader bent upon itself at a predetermined point and formed into an elongated laterally projecting loop, said loop providing an outstanding pliant spreader and having a fishhook secured to its outer free end, means at the juncture of said loop and leader proper joining the strands of the loop to the single strand portion of the leader, a flexure resisting, swing-limiting adapter, said adapter comprising an elongated open-ended funnel-like truncated sleeve having its relatively large open inner end connected to the leader at points spaced above and below the loop and leader joint, and portions of the strands of said loop passing conjointly through the sleeve and then through and outwardly beyond the relatively small truncated outer end of the sleeve.

4. The structure defined in claim 3, and wherein said sleeve is provided at said inner open end with upper and lower aligned holes through which portions of the leader are passed in a manner to connect the sleeve to the leader and to thus keep the sleeve in its loop stiffening and rigidifying position.

5. The structure defined in claim 3, and wherein said sleeve has upper and lower spaced apart walls at its inner end provided with bayonet-type slots with which contiguous portions of the leader are detachably connected.

6. A spreader loop stiffener and flexure resisting adapter for a nylon leader provided with an adjoined outstanding loop-type nylon spreader comprising a readily attachable and detachable hollow plastic truncated pyramidal cone, the larger basal end of said cone having diagonally opposite corner portions provided with bayonet-type attaching and retaining slots for spaced portions of the leader.

7. In combination with a leader adapted to hang vertically straight and of the type including at least one elongated laterally and generally horizontally outwardly projecting loop-type spreader intermediate its upper and lower ends adapted, at its outer end remote from said leader, to be removably interlocked with a loop carried on the end of an associated hook, a spreader loop closing and stiffening attachment comprising an elongated generally horizontally disposed tubular member telescoped over the inner end of said spreader adjacent said leader, said leader and said tubular member including coacting portions securing the inner end of said tubular member adjacent said leader to the latter.

8. The combination of claim 7 wherein said coacting portions includes means removably securing said tubular member to said leader for ready removal therefrom.

9. The combination of claim 7 wherein said loop-type spreader is defined by laterally outwardly directed portions of said leader joined at their outer ends by a continuing portion of said leader.

10. The combination of claim 9 wherein said coacting portions comprise spaced openings formed through the wall portions of the inner end of said tubular member and portions of said leader spaced longitudinally therealong on opposite sides of said laterally directed portions of said leader passed through said openings.

11. The combination of claim 10 wherein said openings are spaced from the innermost end of said tubular member and are therefore out of communication with the innermost end edges of said tubular member.

12. The combination of claim 7 wherein said loop-type spreader is defined by laterally outwardly directed portions of said leader joined at their outer ends by a continuing portion of said leader, said coacting portions comprising spaced openings formed through the wall portions of the inner end of said tubular member and portions of said leader spaced longitudinally therealong on opposite sides of said laterally directed portions of said leader passed through said openings, and means secured to said leader adjacent the inner end of said spreader loop securing said loop in position longitudinally along said leader.

13. The combination of claim 12 wherein the last-mentioned means comprises members encircling said leader at two points spaced longitudinally therealong on opposite sides of said laterally directed portions of said leader.

14. The combination of claim 7 wherein said loop-type spreader is defined by laterally outwardly directed portions of said leader joined at their outer ends by a continuing portion of said leader, said coacting portions comprising spaced openings formed through the wall portions of the inner end of said tubular member and portions of said leader spaced longitudinally therealong on opposite sides of said laterally directed portions of said leader passed through said openings, and means secured to said leader adjacent the inner end of said spreader loop securing said loop in position longitudinally along said leader, said last-mentioned means comprising a tubular element encircling said leader between said laterally directed portions, a pair of integral continuing sections of said leader passing through said tubular element.

References Cited by the Examiner

UNITED STATES PATENTS

| | | | |
|---|---|---|---|
| 2,170,788 | 8/1939 | Augenblick | 43—42.74 |
| 2,392,147 | 1/1946 | Hickson | 43—42.74 |
| 2,397,030 | 3/1946 | Mercier | 43—42.74 |
| 2,577,466 | 12/1951 | Jones | 43—44.83 X |
| 2,727,331 | 12/1955 | Feinberg | 43—44.84 |
| 2,766,547 | 10/1956 | Gallagher | 43—42.74 |
| 2,848,835 | 8/1958 | Witt | 43—42.74 |
| 3,105,318 | 10/1963 | Birrell | 43—42.74 X |

SAMUEL KOREN, *Primary Examiner.*

D. J. LEACH, *Assistant Examiner.*